United States Patent
Gunnip

(10) Patent No.: US 8,548,536 B1
(45) Date of Patent: Oct. 1, 2013

(54) SMART PHONE CASE WITH CARRY STAND

(76) Inventor: Dennis M. Gunnip, Fort Lauderdale, FL (US)

( * ) Notice: Subject to any disclaimer, the term of this patent is extended or adjusted under 35 U.S.C. 154(b) by 0 days.

(21) Appl. No.: 13/448,898

(22) Filed: Apr. 17, 2012

(51) Int. Cl.
*H04M 1/00* (2006.01)

(52) U.S. Cl.
USPC .......................... 455/575.1; 248/585; 248/674

(58) Field of Classification Search
USPC .................. 455/575.1, 550.1; 248/585, 674, 248/676, 534
See application file for complete search history.

(56) References Cited

U.S. PATENT DOCUMENTS

| | | | |
|---|---|---|---|
| 5,383,091 A | 1/1995 | Snell | |
| 7,386,121 B1 | 6/2008 | Rivas | |
| 7,655,318 B2 * | 2/2010 | Hall | 428/542.4 |
| 2004/0020130 A1 * | 2/2004 | Chiang | 49/388 |
| 2006/0214072 A1 * | 9/2006 | Lee | 248/200 |
| 2006/0219521 A1 * | 10/2006 | Enomoto | 198/370.01 |
| 2008/0099638 A1 * | 5/2008 | Diener et al. | 248/176.3 |
| 2010/0210329 A1 | 8/2010 | Merz | |
| 2010/0231815 A1 * | 9/2010 | Kim et al. | 348/836 |
| 2011/0065486 A1 | 3/2011 | Bayrami | |
| 2012/0264491 A1 * | 10/2012 | Singhal | 455/575.1 |
| 2013/0053113 A1 * | 2/2013 | Linhardt | 455/575.1 |

* cited by examiner

*Primary Examiner* — Creighton Smith
(74) *Attorney, Agent, or Firm* — Allen F. Bennett

(57) ABSTRACT

A smart phone case with carry stand that includes a carry stand centrally disposed on a rear surface of a polymeric case, the carry stand including a parallelepiped member having an aperture centrally disposed therethrough, said aperture configured to removably receive a finger of a user therethrough whereby a user may securely grasp the smart phone case with carry stand with one hand, and wherein an outside edge of the carry stand, disposed parallel the rear surface of the case, contacts an extant horizontal surface when the smart phone case with carry stand is placed on said horizontal surface to prop the smart phone case with carry stand angularly upon said horizontal surface and enable hands free viewing of an extant cellular phone used in conjunction with the present device.

3 Claims, 2 Drawing Sheets

Figure 1:
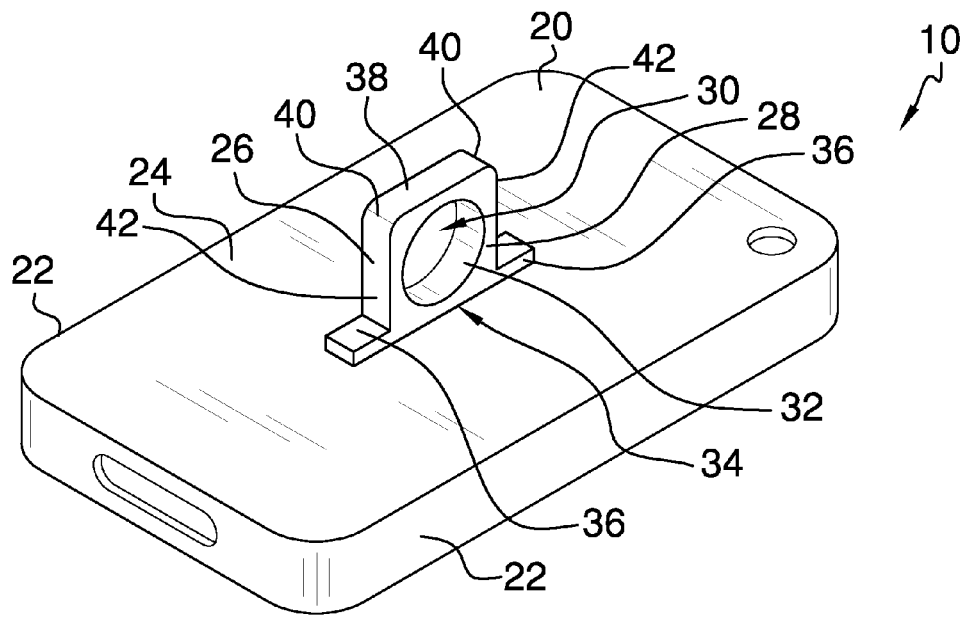

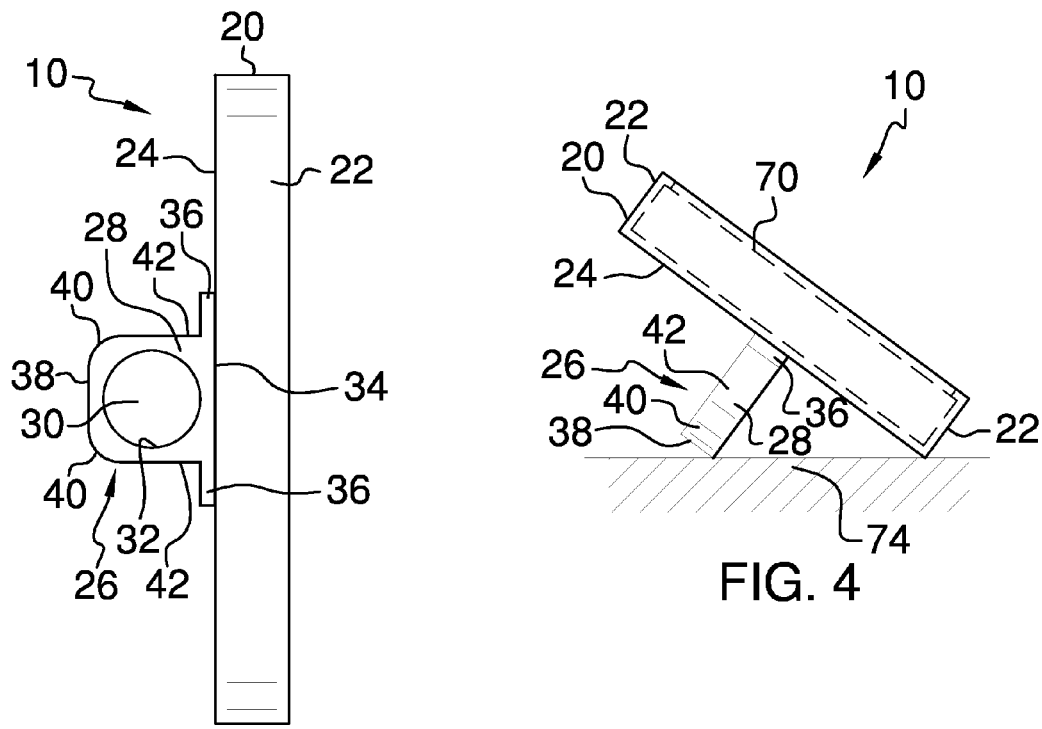
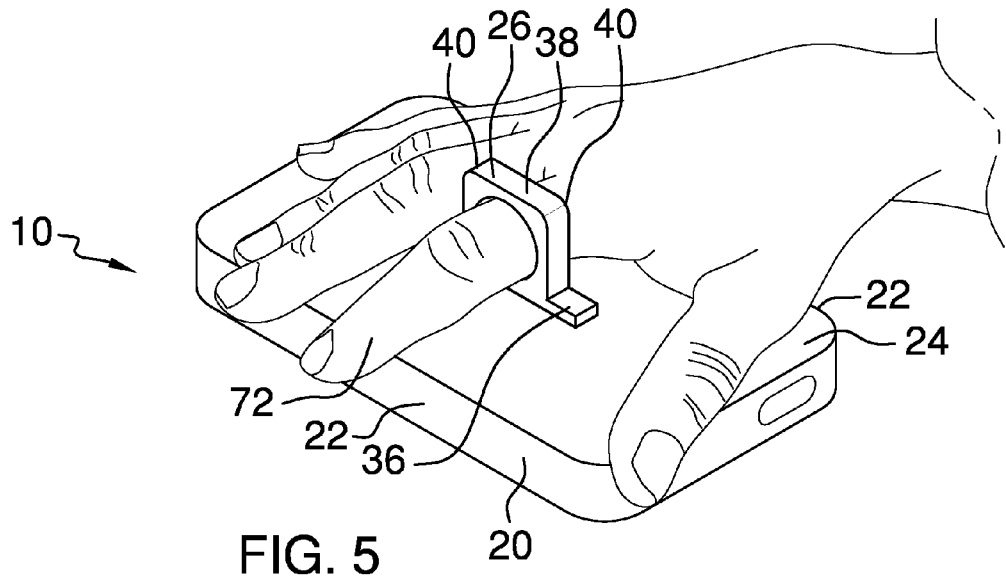

SMART PHONE CASE WITH CARRY STAND

BACKGROUND OF THE INVENTION

Various types of smart phone cases are known in the prior art. However, what is needed is a smart phone case with carry stand that includes a carry stand centrally disposed on a rear surface of a polymeric case, the carry stand including a parallelepiped member having an aperture centrally disposed therethrough, said aperture configured to removably receive a finger of a user therethrough whereby a user may securely grasp the smart phone case with carry stand with one hand, and wherein an outside edge of the carry stand, disposed parallel the rear surface of the case, contacts an extant horizontal surface when the smart phone case with carry stand is placed on said horizontal surface to prop the smart phone case with carry stand angularly upon said horizontal surface and enable hands free viewing of an extant cellular phone used in conjunction with the present device.

FIELD OF THE INVENTION

The present invention relates to a smart phone case with carry stand, and more particularly, to a smart phone case with carry stand that includes a carry stand centrally disposed on a rear surface of a polymeric case, the carry stand including a parallelepiped member having an aperture centrally disposed therethrough, said aperture configured to removably receive a finger of a user therethrough whereby a user may securely grasp the smart phone case with carry stand with one hand, and wherein an outside edge of the carry stand, disposed parallel the rear surface of the case, contacts an extant horizontal surface when the smart phone case with carry stand is placed on said horizontal surface to prop the smart phone case with carry stand angularly upon said horizontal surface and enable hands free viewing of an extant cellular phone used in conjunction with the present device.

SUMMARY OF THE INVENTION

The general purpose of the smart phone case with carry stand, described subsequently in greater detail, is to provide a smart phone case with carry stand which has many novel features that result in a smart phone case with carry stand which is not anticipated, rendered obvious, suggested, or even implied by prior art, either alone or in combination thereof.

Many people know the inconvenience and expense of dropping a cellular phone and breaking it. iPhones in particular, which comprise an amount of glass for the touchscreen function, can be easily cracked, broken, or shattered, and are easily dropped when removed from the pocket. Many cases for smart phones are seen in the prior art to protect an extant cellular phone, but what is needed is a smart phone case with carry stand that enables a person to securely hold an extant cellular phone with one hand, and remove said cellular phone from a pocket with a single hand without fear of dropping the phone.

The present invention, therefore, includes a polymeric case having a pair of long edges and a rear surface. A carry stand is disposed on the rear surface, the carry stand including a parallelepiped member centrally disposed perpendicularly from the rear surface. A circular aperture is centrally disposed through the parallelepiped member, said aperture configured to removably receive a finger of a user grasping the smart phone case with carry stand therethrough. An inside edge is disposed circumferentially around the aperture.

The carry stand further includes a pair of contact struts disposed extending from either end of a contact edge, each of the pair of contact struts and the contact edge attached to the rear surface of the polymeric case. An outside edge is disposed parallel the contact edge and a pair of side edges are disposed perpendicularly between the outside edge and the contact edge. Each of a pair of rounded corners continuously connects the outside edge with each of the respective pair of side edges.

The carry stand not only enables a person to securely grasp the smart phone case with carry stand with one hand but also props the smart phone case with carry stand angularly upon an extant horizontal surface for viewing an extant cellular phone used in conjunction with the smart phone case with carry stand. When placed on an extant horizontal surface with the rear surface disposed down facing, the carry stand contacts said horizontal surface and one of the pair of long edges of the polymeric case also contacts said horizontal surface. In this position, the smart phone case with carry stand supports an extant cellular phone angularly upon the horizontal surface and enables a person to view the cellular phone hands free. The instant smart phone case with carry stand therefore enables hands free viewing of an extant cellular phone for watching video, engaging in video chat or conference, or engaging an extant speaker phone feature of the extant cellular phone used in conjunction with the present smart phone case with carry stand.

Thus has been broadly outlined the more important features of the present smart phone case with carry stand so that the detailed description thereof that follows may be better understood and in order that the present contribution to the art may be better appreciated.

Objects of the present smart phone case with carry stand, along with various novel features that characterize the invention are particularly pointed out in the claims forming a part of this disclosure. For better understanding of the smart phone case with carry stand, its operating advantages and specific objects attained by its uses, refer to the accompanying drawings and description.

BRIEF DESCRIPTION OF THE DRAWINGS FIGURES

Figure 2:
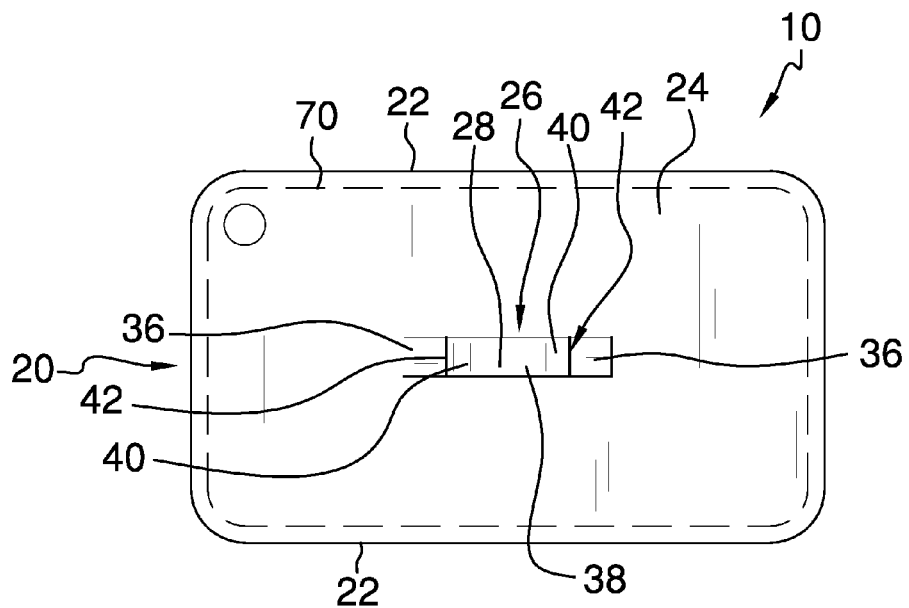

FIG. 1 is an isometric view.
FIG. 2 is a bottom view.
FIG. 3 is a top view.
FIG. 4 is a top view with a smart phone case with carry stand angularly resting on an extant horizontal surface.
FIG. 5 is an in use view.

DETAILED DESCRIPTION OF THE DRAWINGS

With reference now to the drawings, and in particular FIGS. 1 through 5 thereof, example of the instant smart phone case with carry stand employing the principles and concepts of the present smart phone case with carry stand and generally designated by the reference number 10 will be described.

Referring to FIGS. 1 through 5 a preferred embodiment of the present smart phone case with carry stand 10 is illustrated.

The smart phone case with carry stand 10 includes a polymeric case 20 configured to hold an extant cellular phone 70. The case 20 includes a pair of long edges 22 and a rear surface 24. A carry stand 26 is centrally disposed perpendicularly upon the rear surface 24. The carry stand 26 includes a parallelepiped member 28 having an aperture 30 centrally disposed therein, said aperture 30 configured to removably receive a finger 72 of a user therethrough. The aperture 30 is circular and an inside edge 32 circumferentially surrounds the aperture 30.

A contact edge 34 is disposed connected to the rear surface 24. A pair of parallelepiped contact struts 36 is disposed extended from either end of the contact edge 34, each of the pair of contact struts 36 disposed connected to the rear surface 24. An outside edge 38 is disposed parallel the contact edge 34. The outside edge 38 is disposed to contact an extant horizontal surface 74 when the smart phone case with carry stand 10 rear surface 24 is placed on an extant horizontal surface 74. An extant cellular phone 70 is thereby supported at an angle upon said horizontal surface 74, with the instant smart phone case with carry stand 10 resting on the parallelepiped member 28 outside edge 38 and one of the pair of long edges 22 of the smart phone case with carry stand 10.

The carry stand 26 further comprises a pair of rounded corners 40, each of the pair of rounded corners 40 continuously connected with a pair of vertical side edges 42. Each of the pair of side edges 42 is disposed perpendicularly between the outside edge 38 and the contact edge 34. The outside edge 38 is disposed parallel the contact edge 34, both the outside edge 38 and the contact edge 34 are disposed parallel the rear surface 24 of the polymeric case 20. When a cellular phone 70 disposed within the smart phone case with carry stand 10 is placed on an extant horizontal surface 74 with the rear surface 24 of the polymeric case 20 disposed down facing, the carry stand 26 contacts the extant surface 74 and supports the cellular phone 70 at an angle relative the horizontal surface 74, with one of the pair of long edges 22 of the polymeric case 20 resting atop the horizontal surface 74 (see FIG. 4).

When a cellular phone 70 disposed within the smart phone case with carry stand 10 is placed on an extant horizontal surface 74 with the rear surface 24 up facing, the carry stand 26 parallelepiped member 28 projects upwardly, and the polymeric case 20 is flush with the horizontal surface 74.

What is claimed is:

1. A smart phone case with carry stand comprising:
   a polymeric case configured to hold an extant cellular phone, the case having a pair of long edges and a rear surface;
   a carry stand centrally disposed perpendicularly on the rear surface, the carry stand comprising:
      a parallelepiped member having an aperture centrally disposed therein, said aperture configured to removably receive a finger therethrough;
      a contact edge disposed connected to the rear surface;
      a pair of contact struts disposed extended from either end of the contact edge, each of the pair of contact edges disposed connected to the rear surface;
      an outside edge disposed parallel the contact edge, the outside edge disposed to contact an extant horizontal surface when the smart phone case with carry stand is placed on said horizontal surface;
   wherein the carry stand securely mounts the polymeric case around the finger of a user and the carry stand supports the polymeric case angularly upon a horizontal surface for hands free viewing of an extant cellular phone used in conjunction with the smart phone case with carry stand.

2. The smart phone case with carry stand of claim 1 wherein the carry stand further comprises a pair of rounded corners, each of the rounded corners continuously connected with a pair of vertical side edges.

3. The smart phone case with carry stand of claim 2 wherein the aperture is circular and further comprises an inside edge circumferentially disposed about the aperture.

* * * * *